(12) United States Patent
Splaine et al.

(10) Patent No.: US 9,311,682 B2
(45) Date of Patent: Apr. 12, 2016

(54) SYSTEMS AND METHODS TO IDENTIFY CANDIDATES FOR TARGETED ADVERTISING IN AN ONLINE SOCIAL GAMING ENVIRONMENT

(71) Applicants: Steven John Splaine, Tampa, FL (US); Clayton S. Long, Tampa, FL (US)

(72) Inventors: Steven John Splaine, Tampa, FL (US); Clayton S. Long, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 81 days.

(21) Appl. No.: 13/738,469

(22) Filed: Jan. 10, 2013

(65) Prior Publication Data

US 2014/0194208 A1 Jul. 10, 2014

(51) Int. Cl.
*G06Q 50/00* (2012.01)
*G06Q 30/02* (2012.01)

(52) U.S. Cl.
CPC ............... *G06Q 50/01* (2013.01); *G06Q 30/02* (2013.01)

(58) Field of Classification Search
USPC .......................................................... 463/42
See application file for complete search history.

(56) References Cited

U.S. PATENT DOCUMENTS

| | | | |
|---|---|---|---|
| 5,823,879 A | 10/1998 | Goldberg et al. | |
| 6,264,560 B1 | 7/2001 | Goldberg et al. | |
| 7,600,017 B2 | 10/2009 | Holtzman et al. | |
| 7,756,926 B2 | 7/2010 | Tseng et al. | |
| 8,133,116 B1 | 3/2012 | Kelly et al. | |
| 8,167,713 B2 | 5/2012 | Allen et al. | |
| 8,736,612 B1 * | 5/2014 | Goldman et al. | 345/440 |
| 2004/0243532 A1 * | 12/2004 | Steward | 706/57 |
| 2006/0042483 A1 * | 3/2006 | Work et al. | 101/91 |
| 2007/0169165 A1 | 7/2007 | Crull et al. | |
| 2007/0271272 A1 | 11/2007 | McGuire et al. | |
| 2008/0162260 A1 * | 7/2008 | Rohan et al. | 705/10 |
| 2008/0250450 A1 * | 10/2008 | Larner et al. | 725/34 |
| 2009/0018918 A1 * | 1/2009 | Moneypenny et al. | 705/14 |
| 2009/0030772 A1 * | 1/2009 | Flake et al. | 705/10 |
| 2009/0070679 A1 | 3/2009 | Shen et al. | |
| 2009/0217178 A1 * | 8/2009 | Niyogi et al. | 715/753 |
| 2009/0319359 A1 * | 12/2009 | Soza et al. | 705/14.25 |
| 2010/0076850 A1 * | 3/2010 | Parekh et al. | 705/14.66 |

(Continued)

OTHER PUBLICATIONS

Connors, Devin, "Nvidia: Console Software Sales Flat, PC on the Rise," Tom's Hardware, http://www.tomshardware.com/news/nvidia-pc-console-sales-battlefield-3-bf3-pc-gaming,13499.html, Sep. 22, 2011 (2 pages).

(Continued)

*Primary Examiner* — Damon Pierce
*Assistant Examiner* — Anh Vo V Nguyen
(74) *Attorney, Agent, or Firm* — Hanley, Flight and Zimmerman, LLC

(57) ABSTRACT

Systems and methods to identify candidates for targeted advertising in an online social gaming environment are disclosed. Example methods include generating a network graph representative of relationships between users associated with an online social gaming environment, the relationships based on connections between the users. Example methods also include collecting first social gaming data corresponding to participation by a first user and a second user in the online social gaming environment during a first period of time. The example methods further include calculating a first degree of influence of the first user of the online social gaming environment on the second user of the online social gaming environment, the first degree of influence based on the first social gaming data.

14 Claims, 8 Drawing Sheets

(56) References Cited

U.S. PATENT DOCUMENTS

| | | | |
|---|---|---|---|
| 2010/0113160 A1 | 5/2010 | Belz et al. | |
| 2010/0145777 A1* | 6/2010 | Ghosh et al. | 705/14.1 |
| 2010/0205037 A1 | 8/2010 | Besehanic | |
| 2010/0312649 A1* | 12/2010 | Lurie | 705/14.66 |
| 2011/0055132 A1* | 3/2011 | Mahdian et al. | 706/46 |
| 2011/0060821 A1 | 3/2011 | Loizeaux et al. | |
| 2011/0081967 A1 | 4/2011 | Butcher et al. | |
| 2011/0161270 A1 | 6/2011 | Arnett et al. | |
| 2011/0244954 A1 | 10/2011 | Goldman et al. | |
| 2011/0320250 A1* | 12/2011 | Gemmell et al. | 705/14.16 |
| 2012/0028718 A1 | 2/2012 | Barclay et al. | |
| 2012/0059698 A1 | 3/2012 | Watfa et al. | |
| 2012/0122588 A1* | 5/2012 | Berger et al. | 463/42 |
| 2012/0122589 A1 | 5/2012 | Kelly et al. | |
| 2012/0158455 A1* | 6/2012 | Pathak et al. | 705/7.29 |
| 2012/0173701 A1 | 7/2012 | Tenbrock | |
| 2012/0226564 A1* | 9/2012 | Banadaki et al. | 705/14.66 |
| 2012/0278164 A1* | 11/2012 | Spivack et al. | 705/14.52 |
| 2012/0303573 A1* | 11/2012 | Pan et al. | 706/52 |
| 2013/0006709 A1* | 1/2013 | Kosta | 705/7.29 |
| 2013/0006736 A1* | 1/2013 | Bethke et al. | 705/14.12 |
| 2013/0018698 A1* | 1/2013 | Parnaby et al. | 705/7.29 |
| 2013/0018893 A1* | 1/2013 | Nelson et al. | 707/748 |
| 2013/0035983 A1* | 2/2013 | Kursar et al. | 705/7.29 |
| 2013/0103503 A1* | 4/2013 | Zhang et al. | 705/14.66 |
| 2013/0110641 A1* | 5/2013 | Ormont et al. | 705/14.66 |
| 2013/0124448 A1* | 5/2013 | Soulie-Fogelman | 706/52 |
| 2013/0173485 A1* | 7/2013 | Ruiz et al. | 705/319 |
| 2013/0254280 A1* | 9/2013 | Yang et al. | 709/204 |
| 2014/0006176 A1* | 1/2014 | Gudlavenkatasiva et al. | 705/14.73 |
| 2014/0006493 A1* | 1/2014 | Balakrishnan | 709/204 |

OTHER PUBLICATIONS

Aylward, Casey, "Social gaming experts discuss future growth," The Dartmouth, http://thedartmouth.com/2011/04/04/news/gaming, Apr. 4, 2011 (2 pages).

Bass, Dina, "Microsoft's Online Xbox Sales Probably Topped $1 Billion," Bloomberg, http://www.bloomberg.com/news/2010-07-07/xbox-live-sales-probably-topped-1-billion-for-the-first-time.html, Jul. 7, 2010 (3 pages).

Chiang, Oliver, "Microsoft, Nielsen Track Xbox Live Ads," Forbes, http://www.forbes.com/2009/11/19/nielsen-advertising-videogames-technology-internet-microsoft.html, Nov. 19, 2009 (1 page).

Chiang, Oliver, "PlayStation Network Sales Top $800M, Still Unprofitable," Forbes, http://www.forbes.com/sites/oliverchiang/2010/12/27/playstation-network-sales-top-800m-still-unprofitable/, Dec. 27, 2010 (2 pages).

Gilbert et al., "Predicting Tie Strength With Social Media," CHI 2009, Boston, MA, Apr. 4-9, 2009 (10 pages).

Granovetter, Mark, "The Strength of Weak Ties," American Journal of Sociology, vol. 78, Issue 6, May 1973 (22 pages).

Kuchera, Ben, "Battlefield 3 is not coming to Steam but EA has a real reason," Ars Technica, http://arstechnica.com/gaming/news/2011/08/battlefield-3-not-coming-to-steam-ea-provides-good-reason.ars, Aug. 8, 2011 (2 pages).

Nielsen Wire, "Facebook and Twitter Post Large Year Over Year Gains in Unique Users," http://blog.nielsen.com/nielsenwire/global/facebook-and-twitter-post-large-year-over-year-gains-in-unique-users/, May 4, 2010 (1 page).

Nielsen Wire, "Nielsen and Sony Computer Entertainment America to Develop Measurement System for Game Network Advertising," http://www.nielsen.com/us/en/insights/press-room/2007/Nielsen_and_Sony_Computer_Entertainment_America_to_Develop_Measurement_System_for_Game_Network_Advertising.html, Jul. 2, 2007 (2 pages).

Nielsen Wire, "What Americans Do Online: Social Media and Games Dominate Activity," http://blog.nielsen.com/nielsenwire/online_mobile/what-americans-do-online-social-media-and-games-dominate-activity/, Aug. 2, 2010 (3 pages).

Olson, Elizabeth, "For Farmville Players, a Crop From a Real Organic Farm," New York Times, http://www.nytimes.com/2010/07/15/business/media/15adco.html, Jul. 14, 2010 (3 pages).

Rao, Leena, "Zynga and 7-11 Strike Branding Deal, 10% of the U.S. Now Playing Farmville," Tech Crunch, http://techcrunch.com/2010/05/23/zynga-and-7-eleven-strike-multi-million-dollar-branding-deal-10-of-the-u-s-now-playing-farmville/, May 23, 2010 (2 pages).

Snider, Mike, "Social media, mobile devices help video games grow," USA Today, http://www.usatoday.com/tech/news/2011-03-01-videogames01_CV_N.htm, Mar. 1, 2011 (3 pages).

Wikipedia, "Battle.net," http://en.wikipedia.org/wiki/Battlenet, accessed Jan. 8, 2013 (11 pages).

Wikipedia, "Neverwinter Nights," http://en.wikipedia.org/wiki/Neverwinter_Nights_(AOL_game), accessed Jan. 8, 2013 (4 pages).

Wikipedia, "Steam (software)," http://en.wikipedia.org/wiki/Steam_(software), accessed Jan. 8, 2013 (21 pages).

Wikipedia, "Xbox Live," http://en.wikipedia.org/wiki/Xbox_Live, accessed Jan. 8, 2013 (20 pages).

Wikipedia, "Zynga," http://en.wikipedia.org/wiki/Zynga, accessed Jan. 8, 2013 (23 pages).

* cited by examiner

SYSTEMS AND METHODS TO IDENTIFY CANDIDATES FOR TARGETED ADVERTISING IN AN ONLINE SOCIAL GAMING ENVIRONMENT

FIELD OF THE DISCLOSURE

This patent relates generally to online marketing and, more particularly, to systems and methods to identify candidates for targeted advertising in an online social gaming environment.

BACKGROUND

Online social gaming represents a significant portion of how some users spend their time online. As a result, social network games and dedicated social gaming networks have become attractive as online advertising venues and as online sales vehicles.

DETAILED DESCRIPTION

Figure 1:
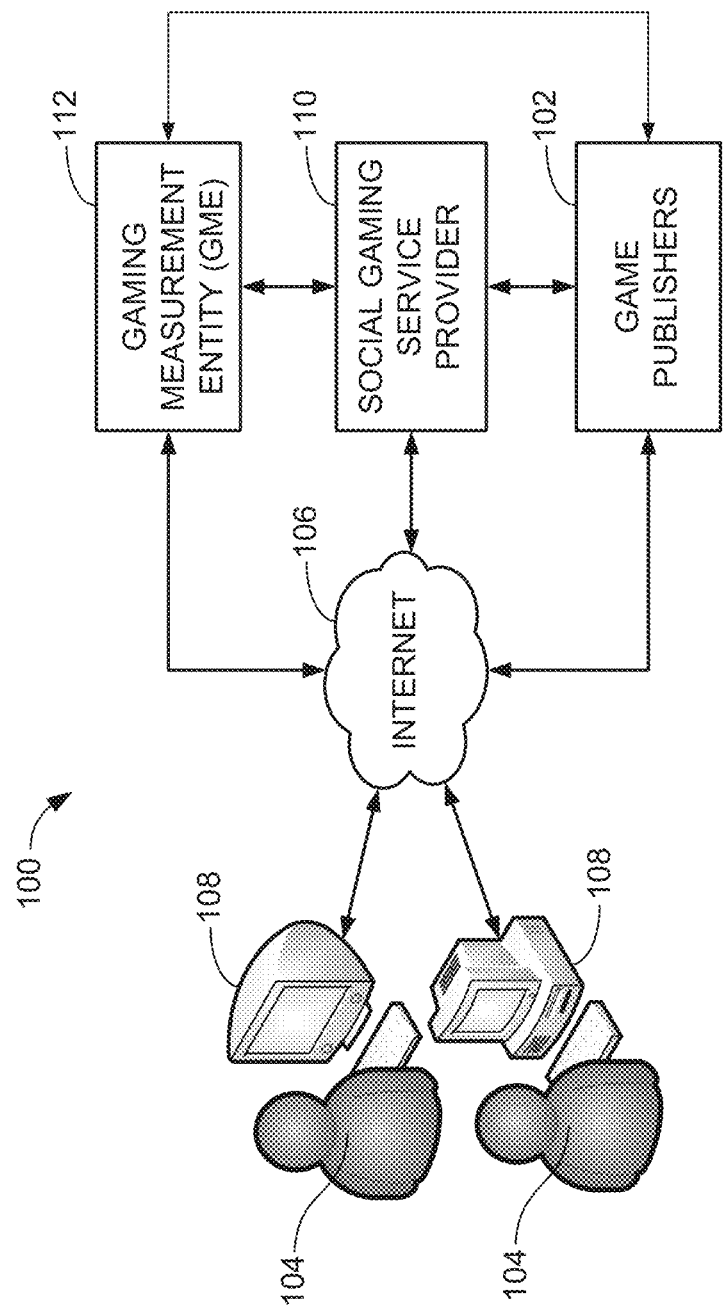
FIG. 1 illustrates an example online social gaming environment.

Social interactions and/or relationships of users play a significant role in the effectiveness of advertising. However, traditional marketing techniques have often relied on demographics and/or geographic locations of potential consumers to direct advertising campaigns without regard to specific social interactions and/or relationships because of the unavailability of such information and/or the difficulty in obtaining such information. However, in the online world, social network websites provide a platform in which individuals make connections and establish relationships that can be monitored and analyzed. In recent years, online social interactions have gone beyond merely making connections and sharing photos to more immersive and interactive activities. One such example includes the playing of games over the internet. While online games may be played independent of social interactions, online gaming is also becoming a form of online social interaction where individuals become members of communities to interact in manners similar to traditional social networks.

Social gaming service providers enable such interactions by hosting or administering online social gaming environments. An online social gaming environment is an online setting in which members of a community may establish connections (e.g., friendships) and interact with other members of the community both while playing games and outside any game play but still within the online community. The characteristics, behavior, and/or interactions of the members associated with an online social gaming environment may be monitored and/or tracked by the social gaming service provider. The resulting data may be analyzed for actual social interactions to identify groups of individuals as candidates for targeted advertising; either with or without resorting to demographic and/or geographic information.

Example systems, methods, and articles of manufacture disclosed herein identify candidates for targeted advertising in an online social gaming environment. In some example methods, a network graph representative of relationships between users associated with an online social gaming environment is generated. The relationships are based on connections between the users. Some such example methods also include collecting first social gaming data corresponding to participation by a first user and a second user in the online social gaming environment during a first period of time. Such methods also include calculating a first degree of influence of the first user of the online social gaming environment on the second user of the online social gaming environment. The first degree of influence is to be based on the first social gaming data.

Additionally, in some such examples, the disclosed methods include predicting a behavior of the second user based on the first degree of influence of the first user on the second users. The methods also include comparing the predicted behavior of the second user to second social gaming data corresponding to participation by the second user in the online social gaming environment during a second period of time after the first period of time. Such example methods further include updating the first degree of influence of the first user on the second user based on the comparison. Some example methods further include analyzing the network graph to identify the first user as a candidate for targeted advertising when the first degree of influence is above a threshold. In yet other examples, methods disclosed herein include generating a sub-network graph representative of relationships between a group of users. The group of users is to correspond to a portion of the users associated with the online social gaming environment having a same characteristic determined from the first social gaming data. The portion of the users is to include the first user and the second user. The characteristic is to be associated with the targeted advertising. Such example methods further include analyzing the sub-network graph to identify the first user as a candidate for targeted advertising when the first degree of influence is above a threshold. In other examples, the methods disclosed here include calculating a second degree of influence of the first user of the online social gaming environment on a third user of the online social gaming environment. In such examples, the methods also include calculating a combined degree of influence for the first user based on the first degree of influence of the first user and the second degree of influence of the first user.

Some example systems disclosed herein include a network graph generator to generate a network graph representative of relationships between users associated with an online social gaming environment. The relationships are based on connections between the users. Some such systems further include an analyzer to determine a first degree of influence of a first user in the online social gaming environment on a second user in the online social gaming environment. The analyzer is to determine the first degree of influence based on first social gaming data corresponding to participation by the first user and the second user in the online social gaming environment during a first period of time.

Some example instructions to be executed on a tangible machine readable storage mediums are disclosed herein that, when executed, cause a machine to at least generate a network graph representative of relationships between users associated with an online social gaming environment, the relationships based on connections between the users. The instructions further cause the machine to collect first social gaming data corresponding to participation by a first user and a second user in the online social gaming environment during a first period of time. The example instructions also cause the machine to calculate a first degree of influence of the first user of the online social gaming environment on the second user of the online social gaming environment, the first degree of influence based on the first social gaming data.

Additionally, in some examples, the first social gaming data includes a historical timeline of transactions, at least some of the transactions corresponding to a purchase of a game, a purchase of a virtual product associated with a game, or a purchase of a real product associated with a game. In some examples, the first social gaming data includes at least one of a duration of the relationship between the first user and the second user, a game preference, an interaction between the first user and the second user, a purchase of a real product associated with a game, an amount of time online, or a frequency of time online. In some examples, the first social gaming data includes at least one of a game played, a game purchased, a type of game played, a type of game purchased, a frequency of game play, an amount of time of game play, or a time of day of game play. In some examples, the first social gaming data includes an overlap of game play with another user. In some examples, the first social gaming data includes a purchase of a virtual product associated with a game. In some examples, the first degree of influence of the first user on the second user is based on an amount of the social gaming data associated with the first user that corresponds to the social gaming data associated with the second user. In some examples, different types of the social gaming data are weighted differently when calculating the first degree of influence of the first user on the second user. In some examples, the online social gaming environment corresponds to one of a social networking website or a dedicated social gaming network. In some examples, the first degree of influence of the first user on the second user is different than a second degree of influence of the second user on the first user.

FIG. 1 illustrates an example online social gaming environment 100. The example environment 100 of FIG. 1 includes one or more game publishers 102 that develop multiplayer games that may be played with members 104 (alternatively referred to herein as users, gamers, or players) of an online community via a network (e.g., the Internet 106, an intranet, the plain old telephone system (POTS), etc.). Although many of the games developed by the game publishers 102 may be played by an individual user 104, in the illustrated example, two or more of the users 104 play one, some, or all of the games together (or against each other) via the network. In the illustrated example, the users 104 play the game(s) via any number and/or type(s) of gaming platform devices 108 having internet connectivity, such as, for example, computers, handheld gaming devices, smart phones, tablets, gaming consoles, smart televisions, etc.

In the illustrated example, the game(s) played by the users 104 are administered through a social gaming service provider 110. In some examples, the social gaming service provider 110 is a social networking website provider (e.g., FACEBOOK, MYSPACE, etc.) that enables members of the social network to play games. In such examples, the game publishers 102 may be the social networking website provider and/or third party entities that develop games and provide them for distribution via the social networking website of the social networking website provider.

In some examples, the social gaming service provider 110 is a dedicated social gaming network or website provider. A dedicated social gaming network or website is similar to a social networking website that is not dedicated to gaming in that a dedicated social gaming network enables a community of users 104 to create profiles, join groups, make connections (e.g., friends) with other members of the network, chat with other members, share content, etc. Furthermore, as with some social networking websites, members or users 104 of a dedicated social gaming network or website may play games with other users 104. In some such examples, the games may be developed by the dedicated social gaming network provider. In other examples, the game publishers 102 may be third party entities that develop games for distribution via the dedicated social gaming network.

There are differences between social networking websites that are not dedicated to gaming and dedicated social gaming networks. For example, the type of platform through which users 104 may access the network to play games is often different between dedicated gaming sites and non-dedicated gaming sites. For example, dedicated social gaming network providers 110 sometimes provide games over a website accessible via a computer (e.g., games provided by STEAM™, a dedicated social gaming website developed by Valve Corporation). However, some such dedicated social gaming networks are additionally or alternatively accessible via a gaming console (e.g., games provided through XBOX LIVE™ or PLAYSTATION™ Network). Additionally, dedicated social gaming networks are different from typical social networking website in that gaming is at the focus of the dedicated social gaming network whereas socializing, developing relationships, and/or making new connections are the focus of social networking websites. As a result, the sort of information, behavior, and/or characteristics of the users 104 and/or the interactions between users 104 that may be tracked by the online social gaming providers 110 in each scenario may be different.

Although these distinctions exist, they are not bright lines and as different aspects of technology, media, and entertainment become more integrated these differences will be even less significant. Thus, despite their differences, both social networking websites which are not dedicated to gaming, and dedicated social gaming networks enable interactions between users 104 both within a game (e.g., match play) and outside a game but within the social networking environment (e.g., chat).

In some examples, the social gaming service provider 110 is an administrator of a massively multiplayer online (MMO) game. Typically, MMOs do not have the same level of social interactions between players as in other online social gaming environments because almost all interactions are in-game. However, players within an MMO may nevertheless establish relationships (e.g., join groups or clans), exchange information, and/or otherwise interact with other players. Accordingly, the teachings of this disclosure may be applied to online social gaming environments associated with MMOs.

Social gaming service providers 110 administer their respective networks. Additionally, in some examples, the social gaming service providers 110 have access to data representative of the behavior and/or activity of individual users 104 within the online social gaming environment. Additionally, such providers often have access to the interactions between users 104 both in-game and out of game, which may be tracked and stored. Such data is herein referred to as "social gaming data." In some examples, social gaming data includes typical social networking data associated with each user 104, such as user profile information for each user 104 (e.g., demographic information, listed interests, etc.), connections between users 104 (e.g., friendship status), the duration of such connections, the amount of time logged in to the network, a frequency of logging in to the network, chats between users 104, the content of chats between users 104, shared content between users 104 (e.g., photos, game designs, etc.), and/or other interactions between users 104 both inside and/or outside of a particular game as well as the timing, frequency, and/or patterns of any such interactions. In some examples, the social gaming data includes the purchase behavior data associated with each user 104 including the purchase of one or more games, the type(s) of game(s) purchased, the purchase of one or more real products associated with the game(s) (e.g., expansion packs, code books, special game controllers, paraphernalia, etc.), the purchase of one or more virtual products associated with the game(s) (e.g., in-game power-ups, weapons, spells, or other resources and/or accessories used during actual game play), the cost of purchases, and/or the timing, frequency, and/or patterns of purchasing any of the game(s), real product(s), and/or virtual product(s) (e.g., a historical timeline of such transactions). Furthermore, in some examples, the social gaming data includes the game playing behavior data associated with each user 104 including the game(s) played, the type(s) of game(s) played, the time of day game(s) are played, the amount of time games(s) are played, the timing, frequency, and/or patterns with which game(s) are played, game preference(s), other users 104 played with, the overlap of game play between users 104, and/or interactions between users 104 while playing game(s).

In some example disclosed herein, the social gaming service provider 110 provides any or all of the social gaming data to a gaming and/or audience measurement entity (GME) 112 such as The Nielsen Company (US) LLC. In some such examples, the GME 112 analyzes the social gaming data to measure the reach and/or conversion rates associated with advertising material presented to users within the online social gaming environment (e.g., in-game advertising and/or advertising outside a game but within the social gaming network). For example, the GME 112 may measure reach by determining the total number of users 104 exposed to a particular advertisement during an advertising campaign. In other such examples, the GME 112 measures reach by determining the total number of users 104 informed of the content of the particular advertisement (e.g., via exposure to the advertisement or via word of mouth through user interactions in the gaming network environment). Similarly, in some such examples, the GME 112 determines conversion rates based on the number of users 104 that actually purchase a game associated with the advertisement (or at least try a demo version of the game). Additionally or alternatively, the GME 112, in some examples, analyzes the social gaming data to determine trends and/or the popularity of games and/or other activities associated with the online social gaming environment.

Furthermore, in some examples, the GME 112 analyzes the social gaming data to determine the strength of connections or relationships between users 104 to identify clusters and/or the degree of clustering (based on a global clustering coefficient), cliques (based on a local clustering coefficient), and/or groups of users that share commonalties and/or have an influence on other users 104 associated with the online social gaming environment. Clusters and cliques are mathematical concepts in graph theory. Cliques are a subset of a network graph where every two nodes or vertices in the subset are connected (e.g., a complete triad). Clusters are more loosely defined as subsets of a network graph that share common characteristics. In addition to looking at cluster, cliques, and/or other groups, in some examples, the GME 112 analyzes the social gaming data to determine a degree of influence of individual users 104 and/or groups of users 104 on other users 104 (e.g., users within a particular cluster, clique, and/or group) and/or on the social gaming network as a whole. In this manner, the GME 112 may identify users 104 as candidates for targeting advertisements (e.g., advertisements relating to games of interest). In some examples, the GME 112 identifies specific users 104 as candidates for targeted advertisements based on the influence of the identified users 104 on other users 104 within the network or any subset thereof. Such information may be valuable to both the social gaming service provider 110 and the game publishers 102. For example, such information may enable game publishers to either develop games based on a particular set of users 104 sharing particular commonalities and/or interests and/or to effectively market their developed games to users 104 most likely to influence others to purchase and play the games developed. The social gaming service provider 110 may use this information to attract game publishers 102 to develop games for distribution via the social gaming network administered by the social gaming service provider 110 and/or to encourage other advertising entities to use the social gaming network as a platform to reach users 104 having desired characteristic(s) that are the focus of the corresponding advertising campaigns. Moreover, based on the measured degrees of influence of the users 104, the online social gaming provider 110 may attract advertisers that desire to reduce costs and/or increase their return on investment by especially targeting influential users 104, as opposed to mass marketing techniques which may cost more without sufficient gain to justify the costs.

In some examples, the GME 112 tracks and analyzes the social gaming data entirely passively (e.g., without the users' knowledge) by simply analyzing the social gaming data provided by the social gaming service provider 110. In other examples, the GME 112 seeks the consent of some or all users 104 and/or requests some or all users 104 to join a panel whose gaming activity is metered to supplement and/or provide additional information from what is available from the social gaming data. In some examples, the social gaming service provider 110 may desire to analyze its own social gaming data to track user participation, behavior, and/or interactions within the online social gaming environment it administers. In such examples, the social gaming service provider 110 performs or implements techniques disclosed herein as being performed or implemented by the GME 112. Accordingly, in such examples, the social gaming service provider 110 tracks user activity and performs the operations of a gaming measurement entity (e.g., the GME 112) without needing to rely on or work with the GME 112 to implement examples disclosed herein. A disadvantage of such an approach is the loss of neutrality, which may make the data provided by the service provider 110 suspect to the third parties (e.g., advertisers).

Unlike other known targeted advertising campaigning methods, the teachings disclosed herein are not based solely on assumptions about the demographics and/or the geographic location of the users 104. Rather, identifying users 104 as candidate targets, in the illustrated example, is based on actual relationships and interactions between users 104 and/or on statistically determined influences of the users 104 on each other regardless of their demographics. This can be especially significant in the online world where a user 104 has control over their own profile to identify their demographics publicly, or remain anonymous on such points. For example, an analysis of social gaming data may reveal that a particular 44 year old female may play similar games to, interact with, and otherwise share commonalities pertinent to the online social gaming environment with a group of other users 104 that largely consists of males aged 20-24. Moreover, the social gaming data may suggest that the 44 year old woman is actually a trend setter having significant influence on what games the other members of the group play and/or what purchases the other members of the group make. However, using traditional demographic analysis to identify common types of users for targeting during an advertising campaign, the 44 year old woman would likely be missed as a target candidate, and not be identified as an influential target candidate. Additionally or alternatively, the teachings of this disclosure provide a method to revise and/or update the calculated degree of influence for each user 104 over time, to refine the model used to identify the target candidates and to track changes and/or shifts in market interest, product adoption, and/or influences of users 104 in the network over time so that targeted advertisements remain relevant and effective and/or so that a total reach of an advertising campaign may be determined. While the teachings of this disclosure do not require the consideration of demographic and/or geographic data, in some examples, such data is nevertheless employed to gain further insights, further improve targets, and/or to obtain a more complete idea of the users 104 and their interactions in the online social gaming environment.

Figure 2:
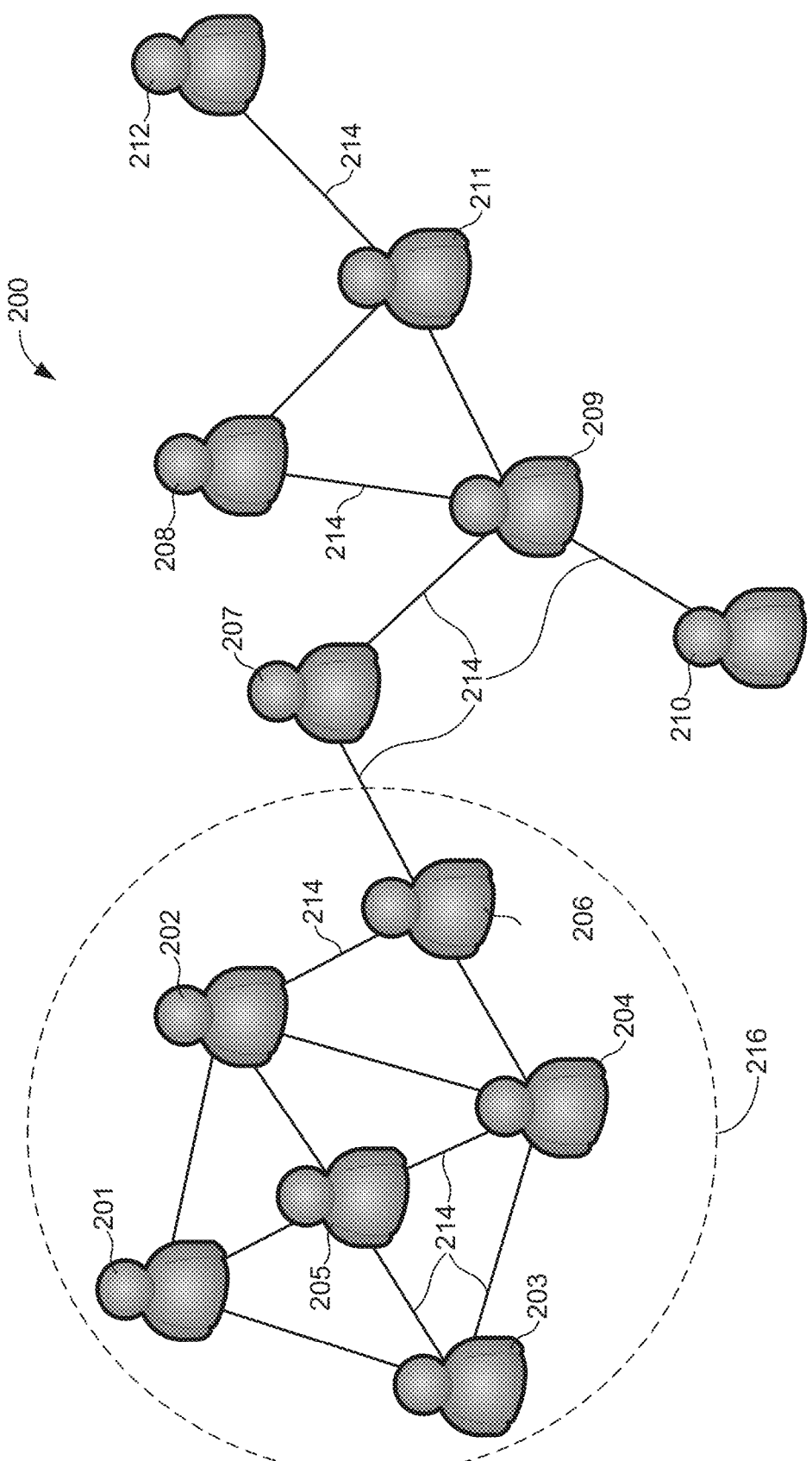
FIG. 2 is a visual representation of an example network graph of users in the example online social gaming environment of FIG. 1.

In some examples disclosed herein, identifying users 104 within an online social gaming environment is accomplished by analyzing the social gaming data for the users 104 in the online social gaming environment using the methodologies of social network analysis (SNA). In general, SNA involves the analysis of "ties" or "edges" (e.g., relationships or connections in online social gaming environment) between separate "nodes" or "vertices" (e.g., individual users 104) in a social network graph (e.g., an interconnected network of users and their relationships in an online social gaming environment). FIG. 2 is a visual representation of an example network graph 200 of users 201-212 in an example online social gaming environment. Each user 201-212 corresponds to one vertex in the network graph 200. Each of the lines 214 between the users 201-212 represents the edge (e.g., relationship) between the users 201-212. Online social gaming environments, as described herein, are especially conducive to SNA because users have explicitly defined relationships based on the friendship status between any two of the users (e.g., either users are connected as friends or they are not connected).

Accordingly, even with minimal data (e.g., defining nothing more than the users 201-212 and their relationships 214), the basic structure of a social gaming network may be represented with a network graph (e.g., the graph 200). Such a network graph (e.g., the graph 200) serves as the basis for SNA inquiries. For example, the network graph 200 may be analyzed to identify clusters, cliques, and/or groups (one of which is identified by reference numeral 216) of users 201-206 from which a degree of influence may be inferred between the members of the cluster (e.g., the users 201-206 of the cluster 216). Additionally or alternatively, depending upon the location of the cluster 216 relative to the rest of the network, a degree of influence of the cluster 216 on other users and/or other clusters in the network graph 200 may also be inferred. In other examples, the connectedness and/or isolation of particular users 201-212 may be identified based on the number of connections or ties with other users 201-212 shown by the structure of the network graph 200. The connectedness and/or isolation may be used as another factor to infer the strength of relationships and/or the degree of influence between the users 201-212 in the network. For example, the user 205 of the illustrated example is directly connected with four other users 201-204 (more than any other user in the example of FIG. 2), whereas the users 210, 212 each have only one connection within the network graph 200. Additionally or alternatively, the degree of separation between any two users 201-212 in the example network graph 200 may be identified to assess the reach of user influence throughout the network graph 200. For example, although user 205 has more connections than any other user, there are six degrees of separation (e.g., six intermediate connections) between the user 205 and the user 212. In contrast, although the user 207 has only two direct connections, the user 207 is never more than three degrees of separation from any other user in the example network graph 200. Moreover, the user 207 is the only link between the users 201-206 shown on the left of the example network graph 200 and the users 208-212 on the right of the network graph 200. Based on this data, it may be inferred that the user 207 plays or may play a critical role in the dissemination of information over the network by acting as a bridge between separate branches.

Figure 2A:
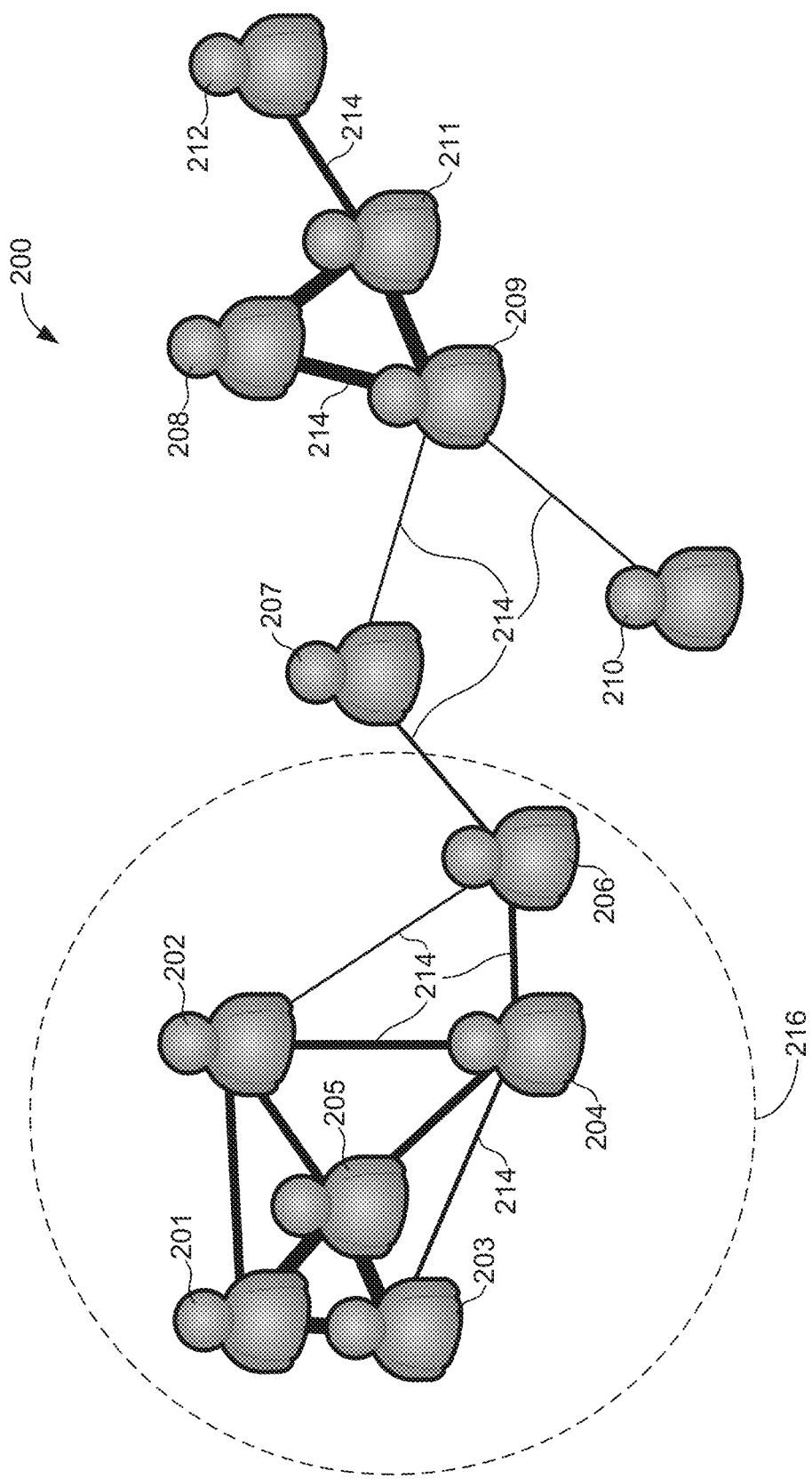
FIG. 2A is a visual representation of an example weighted network graph based on the network graph of FIG. 2.

These and other observations may be drawn from the structure of the example network graph 200 using the methodologies of SNA to analyze the characteristics and/or dynamics of the network graph 200 and to infer the strength of relationships and/or the degree of influence of any particular user and/or group of users within the network 200. However, the above inquiries are limited in that they do not take into account the actual dynamics and/or circumstances between two connected users 201-212. For example, each edge 214 in the example network graph 200 represents a friendship or connection between users, but not all friendships can be assumed to be equal. Accordingly, different edges 214 (e.g., relationships) may be given different weights to represent a strength of the relationship between the corresponding users. For example, user 209 and user 210 may accept each other as friends (represented by the edge or line 214 between the users 209, 210) but thereafter never directly interact with one another within the online social gaming environment. In contrast, another friendship (e.g., connection 214) between user 209 and user 211 may include frequent interactions (e.g., users 209, 211 play three hours of games together each week). In such examples, though user 209 is connected with both user 210 and user 211, the strength of the relationship between user 209 and user 210 may be given a weight of 1 whereas the strength of the relationship between user 209 and user 211 may be given a weight of 3 (where strength 1 is weaker than strength 3). In some examples, the strength of each relationship is ranked on a scale from zero to one. However, any suitable weighting metric may be implemented. Thus, by incorporating other factors from the social gaming data beyond the friendship status, a weighted network graph 200A (as shown in FIG. 2A) may be generated and analyzed to more accurately assess the strength of relationships between users. FIG. 2A is a visual representation of an example weighted network graph 200A corresponding to the same users 201-212 of the network graph 200 of FIG. 2. In the illustrated example of FIG. 2A, the weight of each relationship between the users 201-212 is indicated by the thickness and lengths of the lines 214 (e.g., shorter thicker lines indicate a stronger relationship). In some examples, the weight given to each edge 214 is determined based on the number of commonalities and/or overlapping characteristics and/or behavior between the corresponding users. In other examples, each factor or type of factor available for analysis may be given a different weight based on its significance to the strength of the relationship.

Additionally, the strength of a relationship may be used as a proxy to infer and/or make an initial assumption about a degree of influence between corresponding users in the network graph 200. For example, the stronger a relationship is between two users (based upon the amount of commonalities and/or interactions shared between them), the stronger the influence between the users is assumed. As such, in some examples, the degree of influence of a user with respect to another particular user may be equated with the strength of the corresponding relationship of the user with respect to the other particular user.

However, the assumption of a high degree of influence does not always follow from a strong relationship. For example, if the user 203 and the user 204 have a heavily weighted strength of relationship, simply because the user 203 does one thing does not necessarily mean that the user 204 will follow suit based on the influence of the user 203. Rather, because both users 203, 204 have so many things in common (hence the heavily weighted strength of relationship), if the user 203 does something and finds it interesting, there is a relatively high likelihood that the user 203 will also find it interesting. In such a situation, the strength of the relationship may only indicate an affinity between the users rather than any actual influence of the user 203 on the user 204. However, in some examples disclosed herein, a probability of actual influence of a particular user on another user may be calculated from a statistical analysis of the social gaming data monitored over time as described more fully below. For example, by monitoring the social gaming data over time, the behavior and/or activities of one user can be compared on a timeline against the behavior and activities of another user to identify trends and/or patterns having predictive capability. For example, if after each of four times the user 203 purchases a new game the user 204 purchases the same game within one week, it may be predicted that the next time the user 203 purchases a new game the user 204 will follow suit. Additionally, if an analysis of the data in such an example further shows that each time the user 204 was first to buy a new game the user 203 did not buy the same game, provides an indication that the purchase behavior of 203 is actually influenced by 204 but that user 203 has relatively little influence on the purchasing behavior of the user 204. As more data is analyzed overtime, the probability that the actions of one of the users will influence the other user may be statistically determined and used to evaluate or assign a degree of influence for each user with respect to the other user. While the degree of influence may be predictive of behavior between any two users based on the historical interactions between them, in some examples, the predictive model described herein is further enhanced by aggregating the analysis of the interactions between all users in a social gaming network.

Thus, the strength of a relationship between any two users may be determined based on the common attributes, characteristics, and/or other factors that are shared between the users. As such, in some examples, the strength of relationships between two users is defined with a single weighted value (i.e., the strength is the same in both direction). However, the degree of influence between the same two users may be directional. That is, the degree of influence between the users may be stronger in one direction than it is in the other direction based on the relationship of the activities and interactions between the users over time. Put another way, as described herein, the strength of a relationship is calculated based on a snapshot of the social gaming data at a particular instant in time, whereas the degree of influence from one user on another user is determined based on interactions between the users over time. The additionally data that is gathered and analyzed in determining the degree of influence may affect a change in the calculated strength of the relationship (e.g., if both users purchase the same game(s), the users will have more commonly owned games, thus defining a stronger connection between them). Accordingly, at any point in time the strength of a relationship may be assessed and used as a proxy to infer a degree of influence. However, the strength of relationship does not take into consideration the interactions between users over time (e.g., which user purchased the additional game(s) first and how much time passed before the other user purchased the game(s)?). Thus, by tracking the behavior, attributes, and interactions of users over time a degree of influence may be determined that is different in each direction and, therefore, provides a more robust model with which to predict future behavior.

As an example, user 209 may be friends with user 211 and they may play online games together on a regular basis as described above (thus, the strength of the relationship between the users 209, 211 is relatively strong). However, in some examples, user 209 may also regularly update a network profile that includes frequent post and/or messages about the newest games user 209 is playing and/or recommending. In contrast, user 211 may have a profile that is rarely updated. In such an example, user 209 may be said to have a greater degree of influence on user 211 than user 211 has on user 209 because user 209 is actively publicizing (at least with other friends including user 211) the likes, dislikes, and/or other activities user 209 is involved in relative to the online social gaming environment. Such conduct by user 209 may lead to greater influence on other users in the network. As the interactions and/or behavior of the users 209 and 211 are tracked over time, the resulting data may be analyzed to statistically calculate a probability of the posts by the user 209 actually influencing the user 211 (e.g., there is a 44% chance that if the user 209 recommends a game, the user 211 will purchase the game within the following month after the recommendation). In some examples, the calculation of such a probability is used to quantify the degree of influence between the users 209, 211. In contrast, user 211 is more passively engaged in the online social gaming environment and, therefore, less likely to influence other users. In such examples, as the lack of influence of user 211 is established over time, the degree or weight of influence of user 211 on user 209 may be reduced to a nominal value. Accordingly, although there is a connection 214 between user 209 and user 211 in the network graph 200 with a particular weight representative of the strength of the relationship, the corresponding degree of influence of the first user 209 on the second user 211 may be different than the degree of influence of the second user 211 on the first user 209.

Figure 2B:
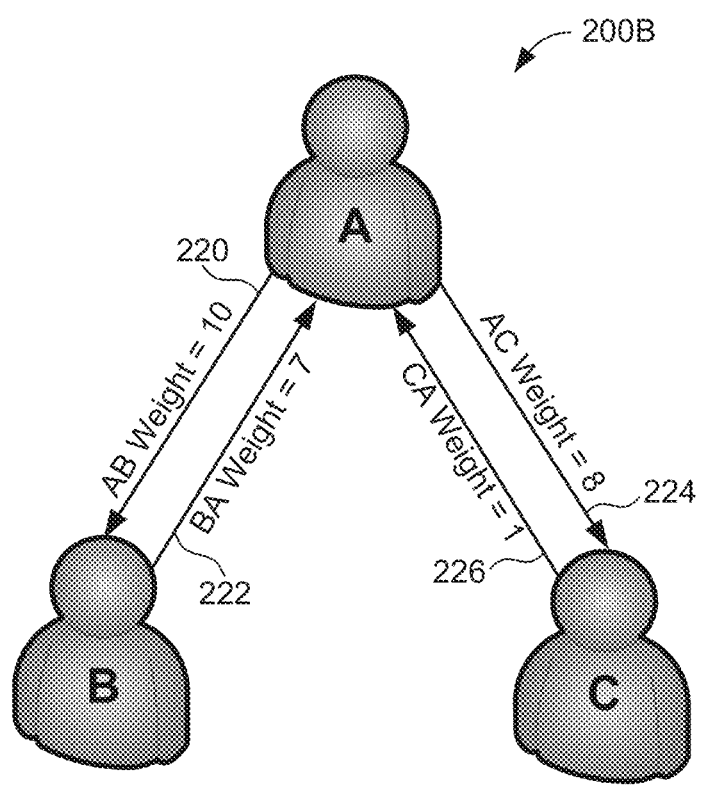
FIG. 2B is a visual representation of an example directional graph of users.

Thus, while the strength of a relationship is defined as between two users, a separate degree of influence is associated with each individual user. However, the degree of influence of a first user on a second user is only applicable to that one relationship. The first user may have an entirely different degree of influence on a third user with which the first user is also connected (i.e., has an explicit relationship based on a first degree connection (e.g., a declared friendship between the users)). For example, FIG. 2B illustrates an example directional network graph 200B containing three users A, B, C. The directional network graph 200B of FIG. 2B is created similarly to the example network graph 200 of FIG. 2 and the example weighted network graph 200A of FIG. 2A except that each relationship or connection in FIG. 2B is defined by two edges (or lines) 220, 222, 224, 226 having arrow heads to represent the direction of influence in each direction. In the illustrated example, user A is connected with the user B via edge AB 220 and edge BA 222, where edge AB 220 is representative of the influence of user A on user B and edge BA is representative of the influence of user B on user A. Similarly, user A and user C are connected via edge AC 224 and edge CA 226. The example directional graph 200B also indicates a weight or degree of influence of each edge 220, 222, 224, 226. As shown in the illustrated example, user A has a relatively high influence on user B (weight of 10) and user C (weight of 8). Furthermore, user B has a relatively high influence (weight of 7) on user A. However, user C has a nominal influence (weight of 1) on user A. In some examples, a nominal influence is assigned to a user that has no appreciable influence on a connection (e.g., a friend) in the graph to at least indicate that the connection exists. As the degree of influence can vary not only in direction but between separate connections of the same user, in some examples, the degree of influence of a user is analyzed with respect to other individual users. In other examples, the degree of influence of the user is analyzed with respect to all users associated with the network graph, or any portion thereof, by appropriately averaging, combining, and/or otherwise taking into account each of the degrees of influence associated with the user.

Quantifying actual influence (based on statistical analysis) between users in an online social gaming environment in this manner enables the identification of users as candidates for targeting in an advertising campaign because they have high levels of influence on other users in the network. In this manner, advertisers may enhance the effectiveness of such campaigns and/or improve their return on investment. Furthermore, in connection with identifying target candidates, the behavior of an identified user may be used to generate a model to predict the behavior of other users influenced by the first users. Additionally, such predictions made at a first point in time may be verified or invalidated based on subsequent feedback from the ongoing collection of social gaming data over time. In this manner, the prediction model can be improved and/or refined over time and/or the shifts in interest, influence, and so forth may be tracked as they evolve and change within the online social gaming environment so that an advertising campaign may target the most influential users at any given point in time and increase the likelihood they will in turn influence other users.

For example, the network graph 200 may be used to predict the purchasing behavior of the users 201-212 based on past purchasing behavior of the users 201-212 along with the other metrics used to determine the strength of relationships and/or the degree of influence between the users 201-212 obtained from the online gaming data. As an example, the purchasing behavior of the users 201-206 of the cluster 216 in the example network 200 (including the historical timeline of transactions for each of the users 201-206) may show that each of the last four times that the user 201 bought a new game, the other users 202-206 also bought the game within the following two weeks. Using SNA to analyze this data along with the other relational information discussed above, user 201 may be assigned a high degree of influence on the other users 202-206. Based on this analysis, it may be predicted, to a statistical probability, that the next time user 201 buys a game, each of the other users 202-206 may follow suit. In some examples, the behavior of the user 201 may be different than the predicted behavior of one or more of the other users. For example, based on the analysis it may be predicted that the next time the user 201 buys a game, the user 206 will try a free demo version of the game.

In some examples, the probability for each of the users 202-206 may be different based on the particular weight of each relationship between each of the users 201-206 and/or the directional degree of influence between the users 201-206. For example, there may be a 90% chance that the users 202, 203, 205 will also buy the game; an 83% chance that user 204 will buy the game; and a 68% chance that the user 206 will try a free demo of the game. At a later time, when the user 201 has actually purchased another game, the social gaming data may be analyzed to determine when, or if, the other users 202-206 in the cluster 216 also purchased the game. If the users 202-205 purchased the game soon after user 201, then the prediction would be validated confirming that the calculated degree of influence from user 201 was accurate. In some example, the degree of influence may even be increased after this confirming data is analyzed. However, in such an example, if the user 206 never played the new game (or at least did not play the game within some threshold period of time proximate to the purchase made by the user 201), the prediction would be inaccurate with respect to the user 206. Accordingly, the degree of influence of the user 201 on the user 206 may be decreased to reflect this additional data. In this manner, the calculated strengths of relationships and/or the degrees of influence of users within a social gaming network may be updated over time to refine and/or track dynamic shifts in the relationships of the users 201-212 and/or other evolving characteristics of the network graph 200 (e.g., identification of clusters and their effect on the network). Accordingly, the most influential users at any given time (in terms of the above-described analysis) may be identified for selection as candidates for targeted advertising.

In some examples, it is beneficial to filter or limit SNA inquiries to a particular subset of users associated with an online social gaming environment. For example, a game publisher (e.g., the game publisher 102 of FIG. 1) may develop a first person shooter game that the game publisher desires to market within the online social gaming environment. However, in such examples, the game publisher will have little interest in targeting users that play other types of games (e.g., third person role-playing games, computerized board games, puzzle games, etc.), even if they have a high degree of influence on other users within their realm of connections. Accordingly, in some examples, the network graph (e.g., the network graph 200) may be filtered or limited to only include users that play or otherwise show some interest in first person shooter games. By removing all other users, the entire dynamics and/or characteristics of the network graph may change with the remaining relationships having different calculated strengths and the users having different degrees of influence on each other than in the full network graph. Such limited graphs are referred to herein as sub-network graphs. Based on an analysis of a generated sub-network graph, users represented in the sub-network graph having a high degree of influence may be identified and provided to the game publisher as candidates for targeting in advertising the new game. Although the illustrated example network graphs 200, 200A of FIGS. 2 and 2A only have twelve users 201-212, many actual networks comprising an online social gaming environment include thousands or even millions of users having any number of connections with any number of characteristics. Accordingly, the users associated with a particular social gaming network may be grouped, divided, and/or subdivided in any number of ways and/or quantities.

Additionally, the characteristic(s) used to limit a network graph need not be limited to a type of game as described in the example above but could include any parameter or factor associated with the social gaming data. For example, a social network graph may be filtered based on the time of day when users play games, the amount of game play, the number of connections each user has, and so forth. In some examples, network graphs are filtered by the strength of relationships and/or the degree of influence users and/or a cluster or clique of users have on other users, other clusters, and/or the network as a whole (e.g., only users having a degree of influence higher than a threshold may be included in a sub-network graph). Additionally or alternatively, a sub-network graph may be filtered based on a second characteristic to further increase the granularity and/or focus with which users are to be identified as primary targets for advertising.

Figure 3:
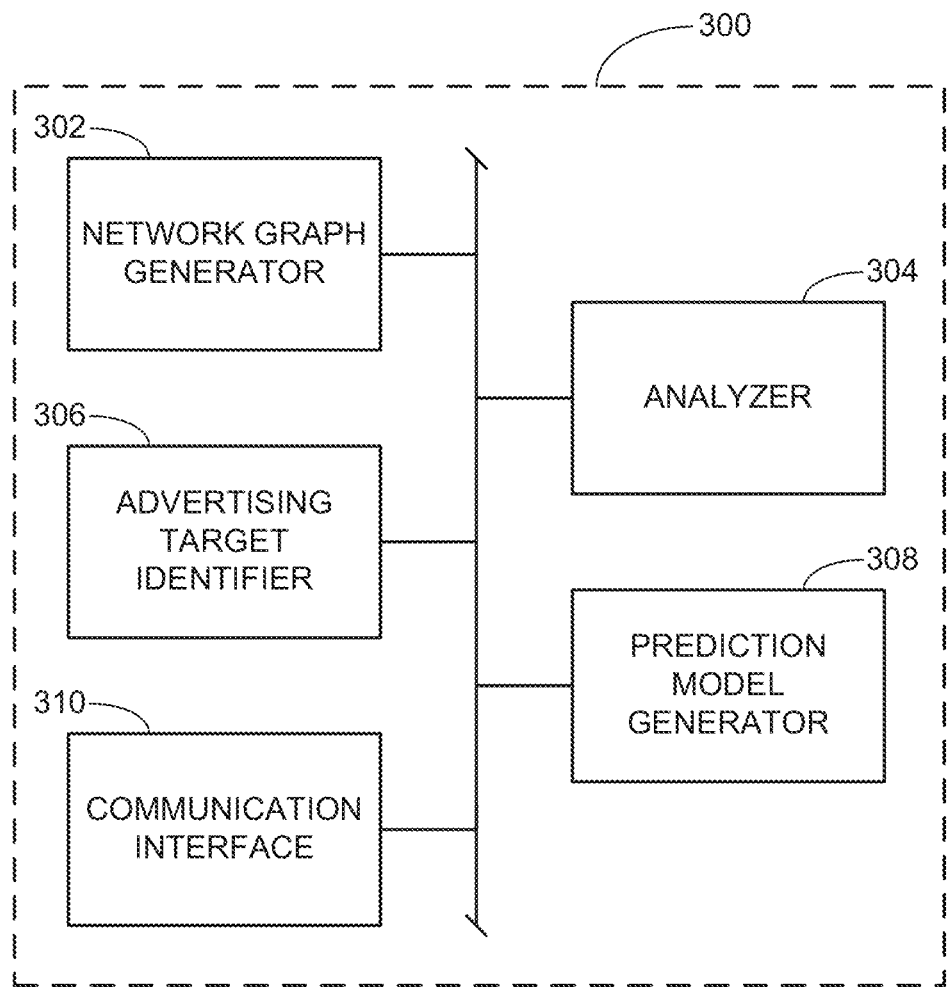
FIG. 3 is an example apparatus constructed in accordance with the teachings disclosed herein to identify users as candidates for targeted advertising in the example environment of FIG. 1.

FIG. 3 shows an example apparatus 300 constructed in accordance with the teachings disclosed herein to identify users as candidates for targeted advertising. In some examples, the apparatus 300 is implemented by the GME 112. In the illustrated example of FIG. 3, the example apparatus 300 includes an example network graph generator 302, an example analyzer 304, an example advertising target identifier 306, an example prediction model generator 308, and an example communication interface 310.

While an example manner of implementing the apparatus 300 of FIG. 3 has been illustrated in FIG. 3, one or more of the elements, processes and/or devices illustrated in FIG. 3 may be combined, divided, re-arranged, omitted, eliminated and/or implemented in any other way. Further, the example network graph generator 302, the example analyzer 304, the example advertising target identifier 306, the example prediction model generator 308, the example communication interface 310, and/or, more generally, the example apparatus 300 of FIG. 3 may be implemented by hardware, software, firmware and/or any combination of hardware, software and/or firmware. Thus, for example, any of the example network graph generator 302, the example analyzer 304, the example advertising target identifier 306, the example prediction model generator 308, the example communication interface 310, and/or, more generally, the example apparatus 300 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example analyzer 304, the example network graph generator 302, the example advertising target identifier 306, the example prediction model generator 308, and the example communication interface. 310 are hereby expressly defined to include a tangible computer readable storage medium such as a memory, DVD, CD, or BluRay storing the software and/or firmware. Further still, the example apparatus 300 of FIG. 3 may include one or more elements, processes and/or devices in addition to, or instead of, those illustrated in FIG. 3, and/or may include more than one of any or all of the illustrated elements, processes and/or devices.

Turning in detail to FIG. 3, the example apparatus 300 is provided with the network graph generator 302 to identify the connections (e.g., friendships) between each user in the online social gaming environment based on the social gaming data. Using such data, the example network graph generator 302 constructs a network graph (e.g., the example network graph 200 of FIG. 2) having edges (corresponding to the relationships) connecting vertices (corresponding to the users of the network) to represent the basic social structure of the online social gaming environment. As described above in connection with FIG. 2, in some examples, this basic network graph serves as the basis for analyzing the social gaming data using SNA methodologies.

In the illustrated example, the analyzer 304 is provided to analyze the basic network graph in conjunction with the social gaming data to determine a weight of each edge (e.g., relationship) between any two connected users to indicate the relative strength of the relationship between the users. Additionally, in some examples, the example analyzer 304 also analyzes the relationships to calculate a degree of influence each user has on the other users in the network. In some examples, the strength of relationship and/or the degree of influence between two connected users may be directional (e.g., user A has more influence on user B than user B has on user A). The results of the analysis by the example analyzer 304, in connection with the network graph produced by the example network graph generator 302, are used to generate a weighted network graph (e.g., the example weighted graph 200A of FIG. 2A).

In the illustrated example, the apparatus 300 is also provided with the advertising target identifier 306 to identify users within the online social gaming environment as candidates to be targeted during an advertising campaign based on the weighted network graph 200A. In some examples, the target candidates correspond to users having a degree of influence above a threshold. In some examples, the candidates are identified from the entire weighted network graph 200A. In other examples, the candidates may be identified from a sub-network graph generated by filtering the weighted network graph 200A based on limiting characteristics and/or behaviors of the users. In some such examples, the network graph generator 302 is implemented to remove users from the weighted network graph based on the filter criteria to generate the desired sub-network graph.

In the illustrated example, the apparatus 300 also includes the prediction model generator 308 to model the relationships within the network graph associated with the online social gaming environment and predict the behavior of corresponding users based on statistical probabilities. Additionally or alternatively, the example prediction model generator 308 refines and/or revises the model as additional data is analyzed and/or as the interests, influences, and/or relationships of the users shift and/or change. Furthermore, in some examples, the prediction model generator 308 may confirm whether the prediction(s) were accurate based on subsequently collected and analyzed social gaming data to adjust and/or update the strength of relationships and/or the degree of influence between any of the users. With the updated data, the advertising target identifier 306 in some examples then recalculates which users should be candidates for targeted advertisements. In this manner, the relevance and/or effectiveness of an advertising campaign can be tracked and/or modified on a regular basis to account for any shifts in interest, influence, etc., within the online social gaming environment to enhance an advertiser's return on investment.

In some examples, a prediction model is generated by first creating a network graph that shows the connections declared within the social network. In some examples, the network graph is directional (i.e., two directional edges defining the relationship between every two connected users). For example, if user A and user B have declared themselves as friends then that relationship would be a connection, defined with edges AB and BA in the graph G, where A is a node representing user A and B is a node representing user B and AB is an edge connecting node A to node B and BA is an edge connecting node B to node A. In some examples, the edges within the graph are then weighted based on a calculated strength of the relationship between user A and user B. In some such examples, a degree of influence may be inferred from the strength of a corresponding relationship. In some examples, the degree of influence for edge AB may start the same as for edge BA (e.g., based on the initial assessment of the strength of the relationship), but as additional data is collected and analyzed over time, the degree of influence of user A on user B (represented by edge AB) and the degree of influence of user B on user A (represented by edge BA) may be adjusted such that the values diverge.

The factors that contribute to the weight of an edge that translates into a degree of influence for a relationship corresponding to the edge between two users are determined by the available data for the individual users. For example, some dedicated social gaming network providers (e.g., STEAM™) track a number of parameters and/or attributes that may be used as factors to determine the strength of a relationship and the resulting degree of influence between two users including: commonly owned game(s), overlapping game play, overlapping most played game(s), overlapping group(s) (e.g., group(s) of users sharing common interests and/or interacting in episodic and/or temporary situations), overlapping primary group (e.g., close group of users having common interests and interacting in many capacities on a frequent basis over an extended period of time), last date online, and geographic location of the users (e.g., geographic distance between users).

In some examples, each attribute is evaluated over time to determine the proportion of the weight assigned to each edge to which each attribute contributes. For example, a directional graph, like the one just described above, may be initially weighted strictly by games owned by both users on some date X (e.g., the strength of each relationship is weighted based on the number of games that are owned by both users in each relationship). At some later date Y (e.g., one week later, one month later, etc.) it may be determined that in 68% of all relationships (e.g., edges AB or BA) in the graph associated with two users owning three or more game in common (at date X), one of the users in each corresponding relationship increased the number of commonly owned games. That is, between the date X and the date Y, one user (e.g., user B) bought a game that the other user (e.g., user A) already owned. In such examples, the weight of the edge (e.g., edge AB) directed toward the user who increased the number of commonly owned games (e.g., user B) would be adjusted proportionally to the 68% value relative to other attributes listed above which may also be determined to be factors in game purchasing. In such examples, the amount of each attribute factored into a total weight W of an edge AB between two users would then reflect the expected influence that user A has over user B. In some examples, if no purchasing adoption (e.g., user A purchasing a game owned by user B) was noticed over time, then a nominal value N can be assumed for the corresponding directional edge (e.g., edge BA). In this manner, as additional social gaming data is collected and analyzed, the weighting of the edges, and corresponding degrees of influence, are adjusted and refined to reliably predict the behavior of users based on the influence of other users. Additionally or alternatively, the weight of an edge in some examples is aged (e.g. priority aging) because the degree of influence between users may change over time. For example, weighting calculations based on most recent interactions and/or attributes shared between users are given the greatest weight while interactions and/or attributes that are increasingly remote in a temporal sense are given progressively less weight. In other examples, the aging of edge weights is estimated instead of exhaustively evaluated across all attributes.

Furthermore, in the illustrated example, the apparatus 300 is provided with the example communication interface 310 to enable the game publishers 102 and/or the social gaming service provider 110 to be provided with any data resulting from the analysis described above. For example, the users identified as candidates for targeted advertising may be provided to the social gaming service provider 110 to be used in negotiating pricing for advertising space for the game publishers 102 and/or other third party advertisers. Additionally or alternatively, the target candidate information may be provided to the game publishers 102 directly to reach out and target the identified users. Additionally, information about the relationships and/or influences of users within the online social gaming environment may be provided to the game publishers 102 to identify trends and/or common interests of users with high degrees of influence to design and develop new games and/or other content that might appeal to them.

Figure 4:
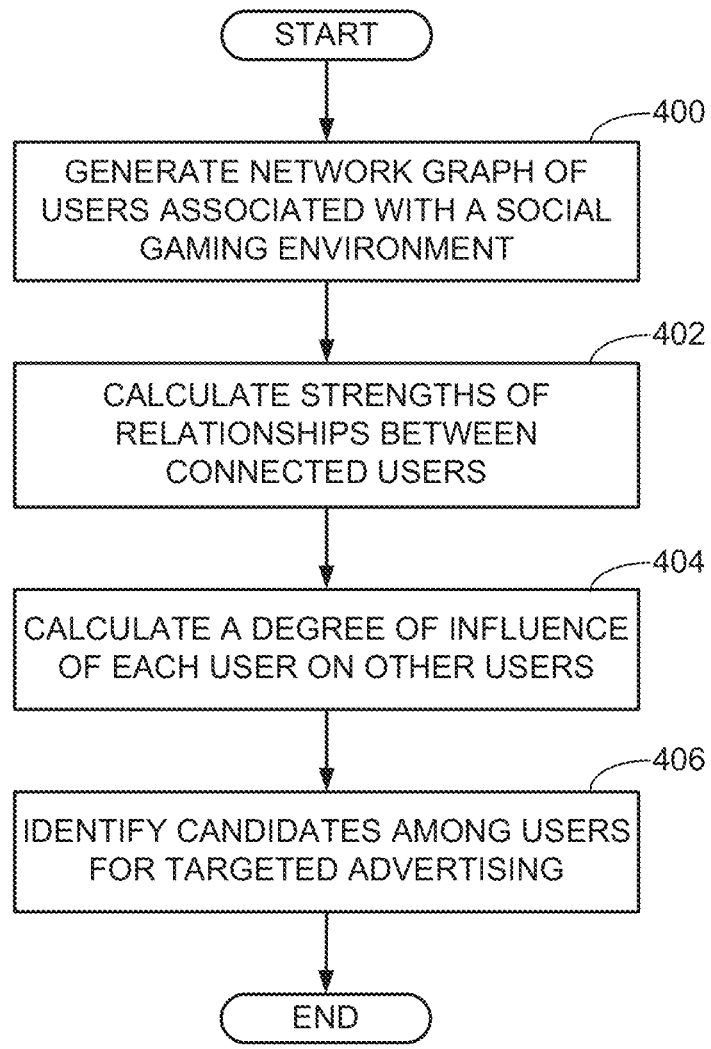
FIG. 4 is a flow diagram representative of example machine readable instructions which may be executed to implement the example apparatus of FIG. 3 to identify candidates among members of an online social gaming environment for targeted advertising.
Figure 5:
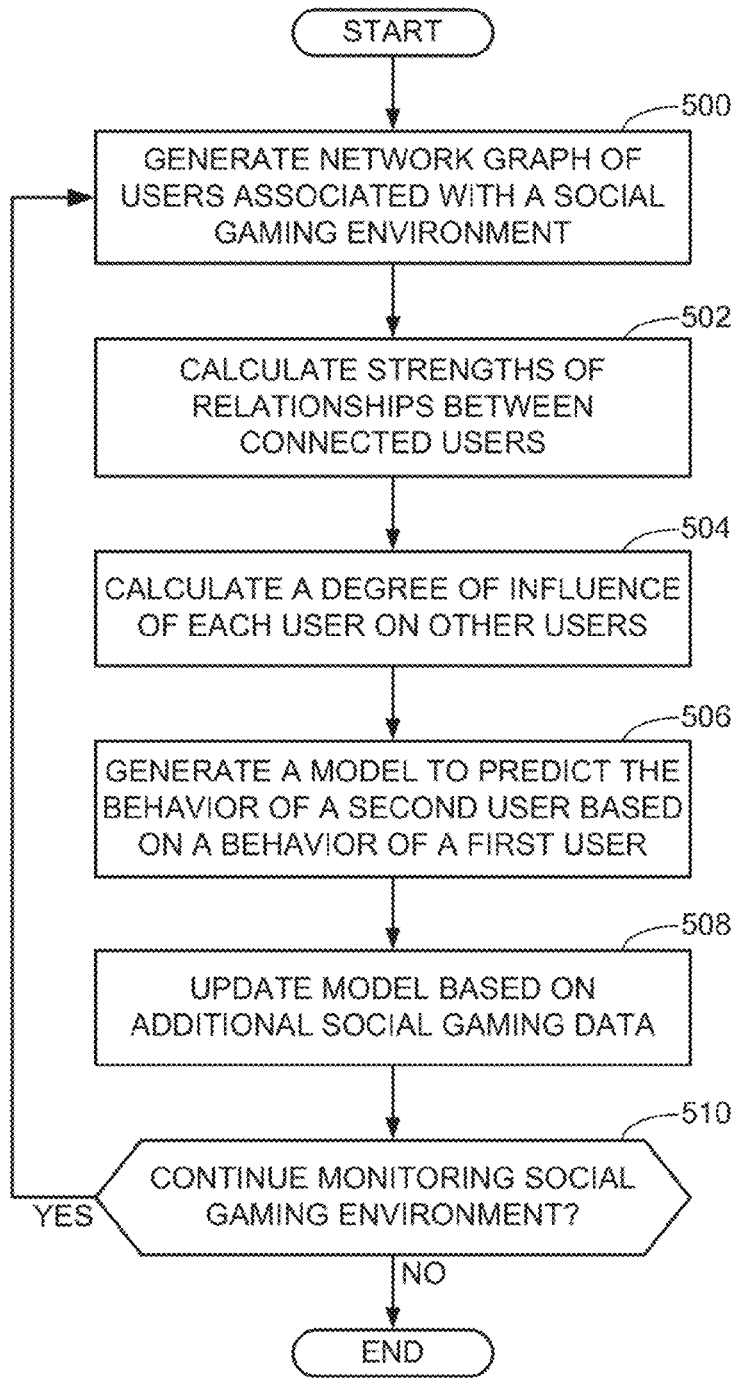
FIG. 5 is a flow diagram representative of example machine readable instructions which may be executed to implement the example apparatus of FIG. 3 to generate a model to predict the behavior of a second user based on the behavior of a first user.

Flowcharts representative of example machine readable instructions for implementing the apparatus 300 of FIG. 3 are shown in FIGS. 4 and 5. In these examples, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a BluRay disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and 5, many other methods of implementing the example apparatus 300 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other physical storage device or storage disk in which information is stored for any duration (e.g., for extended time periods, permanently, brief instances, for temporarily buffering, and/or for caching of the information). As used herein, the term tangible computer readable storage medium is expressly defined to include any type of computer readable storage device or storage disk and to exclude propagating signals. Additionally or alternatively, the example processes of FIGS. 4 and 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The example flowchart of FIG. 4 is representative of an example program to identify candidates among members of an online social gaming environment for targeted advertising. The example program begins when the network graph generator 302 of FIG. 3 generates a network graph of users associated with an online social gaming environment (block 400). In some examples, the network graph uses social gaming data obtained by a social gaming service provider (e.g., the social gaming service provider 110 of FIG. 1). The network graph is representative of the users associated with the online game environment and their connections (e.g., friendship status). Thus, the network graph is representative of the basic social structure of users within the online social gaming environment.

The example analyzer 304 calculates strengths of relationships between connected users in the network graph (block 402). In some examples, the strength of a relationship is based on factors, characteristics, behaviors, and/or other information in the social gaming data associated with each of the users. In some examples, social gaming data includes any of social networking data, purchase behavior data and/or game playing behavior data. Based on the amount of commonality and/or overlap of these factors between each set of connected users, each relationship (e.g., connection) may be assigned a particular weight.

The analyzer 304 calculates a degree of influence of each user on other users (block 404). In some examples, the degree of influence is inferred from the strength of the corresponding relationship (i.e., the degree of influence is based on the same or similar factors from the social gaming data). In some such examples, the degree of influence is refined as the factors used to initially assess the strength of each relationship is tracked and analyzed over time. In some examples, the degree of influence is based on other information available from the social gaming data. In some examples, the degree of influence is directional in that it is different going from a first user to a second user than it is going from the second user to the first user. In some examples, the degree of influence of a first user on a second user is combined and/or averaged with the degrees of influence of the first user on all other users with which the first user has a relationship within the online social gaming environment. Additionally or alternatively, the degree of influence of each user on other users may also be used and/or analyzed to determine the influence of groups of users (e.g., clusters) within the network graph on other users and/or groups of users.

Next, the target identifier identifies candidates among the users for targeted advertising (block 406). In some examples, users having the highest degrees of influence (e.g., a degree of influence above a predetermined threshold) are selected as candidates because they are the most likely to then influence others. In such examples, the degree of influence may be with respect to connection (e.g., friend) of the user, a group of connections, a group of users within the online social gaming environment (whether connected or not to the user), and/or all users in the network. In some examples, candidates for targeted advertising are identified from only a subset of users in the online social gaming environment associated with one or more characteristics defined by the social gaming data. In such examples, the example network graph generator 302 generates a sub-network graph (block 400), the example analyzer 304 calculates the strength of relationships in the sub-network (block 402), and the example analyzer 304 calculates the degree of influence of each user (block 404) before identifying the candidates for targeted advertising (block 406). After the proper user(s) are identified as candidates for targeted advertising, the example program of FIG. 4 ends.

Turning now to FIG. 5, the example program depicted may be executed to generate a model to predict the behavior of a second user based on the behavior of a first user. Upon initiations, the example the network graph generator 302 generates a network graph of users associated with an online social gaming environment (block 500). In some examples, the network graph generator 302 uses social gaming data obtained by a social gaming service provider (e.g., the social gaming service provider 110 of FIG. 1). The network graph is representative of the users associated with the online game environment and their connections (e.g., friendship status). Thus, the network graph is representative of the basic social structure of users within the online social gaming environment.

Next, the example analyzer 304 calculates strengths of relationships between connected users in the network graph (block 502). In some examples, the strength of a relationship is based on factors, characteristics, behaviors, and/or other information in the social gaming data associated with each of the users. In some examples, social gaming data includes any of social networking data, purchase behavior data and/or game playing behavior data. Based on the amount of commonality and/or overlap of these factors between each set of connected users, each relationship (e.g., connection) may be assigned a particular weight The example analyzer 304 next calculates a degree of influence of each user on other users (block 504). In some examples, the degree of influence is inferred from the strength of the corresponding relationship (e.g., the degree of influence is based on the same or similar factors from the social gaming data). In some examples, the degree of influence is based on other information available from the social gaming data. In some examples, the degree of influence is directional in that it is different going from a first user to a second user than it is going from the second user to the first user. In some examples, the degree of influence of a first user on a second user is combined and/or averaged with the degrees of influence of the first user on all other users with which the first user has a relationship within the online social gaming environment. Additionally or alternatively, the degree of influence of each user on other users may also be used and/or analyzed to determine the influence of groups of users (e.g., clusters) within the network graph on other users and/or groups of users.

The example prediction model generator 308 generates a model to predict the behavior of a second user based on a behavior of a first user (block 506). In some examples, the prediction is a probability that a particular behavior by a first user will result in (e.g., influence) the behavior of a second user. In some such examples, the probability is based on a statistical analysis of the degrees of influence associated with each user on other users associated with a network graph or any part thereof (e.g., the users associated with a sub-network graph). In some such examples, the behavior of the second user may be the same as the first user (e.g., the second user will purchase the same game purchased by the first user). In other such examples, the behavior of the second user may be different than the first user (e.g., the second user will start playing a demo version of a game after the first user purchases the game). In some examples, the prediction is made based on the actual behavior of the first user as represented in the social gaming data. In other examples, the prediction is based on a theoretical scenario of behavior by the first user.

The example prediction model generator 308 updates the model based on additional social gaming data (block 508). Once a prediction has been made, additional social gaming data obtained at a later time (e.g., after the period for the prediction has past) may be analyzed to determine whether the model is accurate. In some examples, if the additional social gaming data confirm the prediction, the model is validated. In some such examples, the model is updated by adjusting (e.g., increasing) the probability of the predicted behavior based on this confirmed observation. In other examples, if the additional social gaming data invalidate the prediction, or otherwise contradicts the prediction (e.g., the second user did the predicted behavior but now within the predicted timeframe), the model would be updated accordingly.

If monitoring is to continue (block 510), control returns to block 500 to generate and/or update the network graph based on additional social gaming data. In this manner, a feedback loop is established to constantly refine the prediction model based on the most recent social gaming data available. Furthermore, the feedback loop enables the model to account for shifts in interests, strengths of relationships, degrees of influence, and/or any other change in the dynamics and/or characteristics of users in the online social gaming environment. If monitoring is not to continue (block 510), the example program of FIG. 5 ends.

Figure 6:
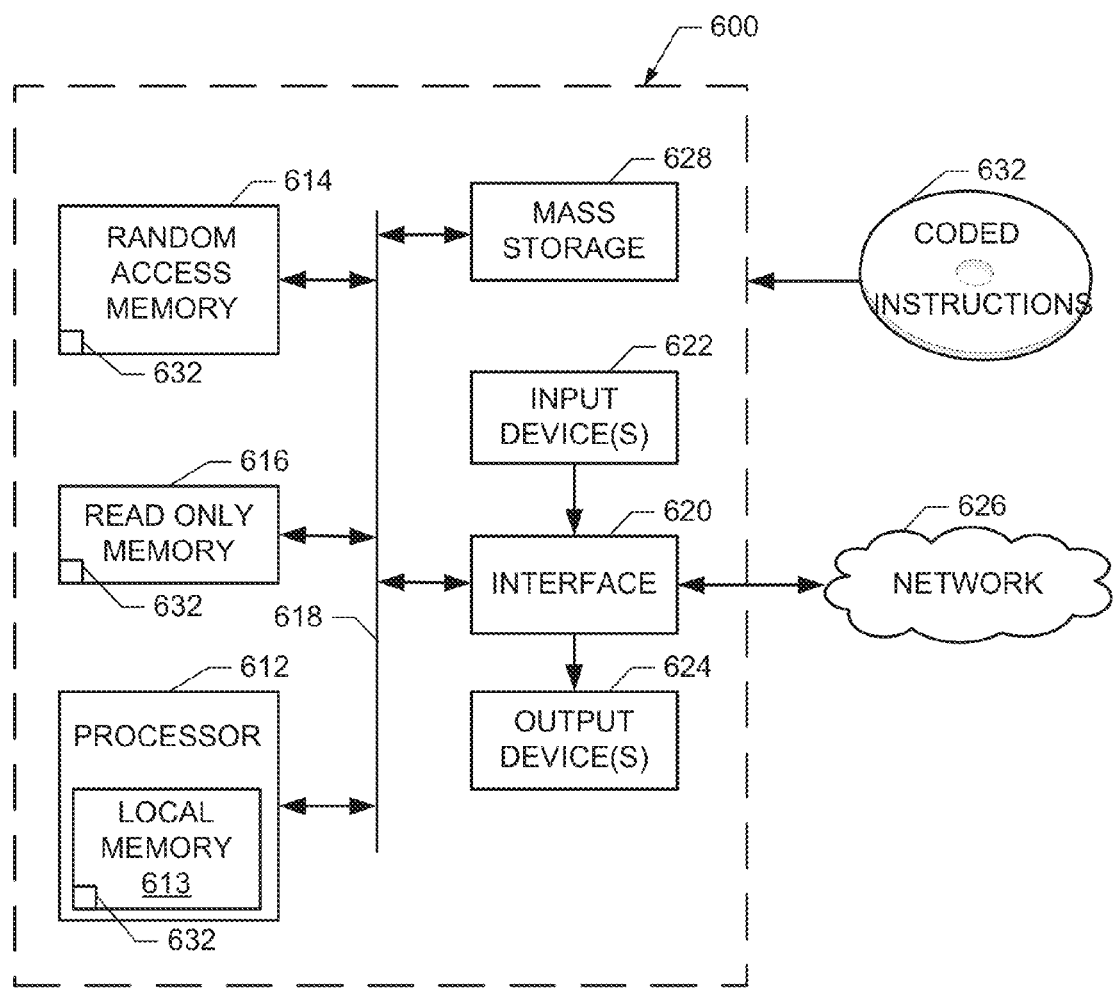
FIG. 6 is a block diagram of an example processor platform capable of executing the instructions of FIGS. 4 and/or 5 to implement the apparatus of FIG. 3.

FIG. 6 is a block diagram of an example processor platform 600 capable of executing the instructions of FIGS. 4 and/or 5 to implement the apparatus of FIG. 3. The processor platform 600 can be, for example, a server, a personal computer, an Internet appliance, or any other type of computing device.

The process platform 600 of the instant example includes a processor 612. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touch screen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives.

Coded instructions 632 to implement the example processes of FIGS. 4 and 5 may be stored in the mass storage device 628, in the volatile memory 614, in the non-volatile memory 616, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A computer implemented method comprising:
generating a network graph representative of relationships between users associated with an online social gaming environment, the relationships based on connections between the users;
collecting first social gaming data corresponding to participation by a first user and a second user in the online social gaming environment during a first period of time;
assigning different weights to different types of the first social gaming data based at least in part on when the different types of the first social gaming data were collected, a first weight of older social gaming data of a first type being less than a second weight of newer social gaming data of the first type;
calculating, via a processor, a first degree of influence of the first user of the online social gaming environment on the second user of the online social gaming environment, the first degree of influence based on the weights of the first social gaming data;
predicting, via the processor, a behavior of the second user based on the first degree of influence of the first user on the second user;
comparing, via the processor, the predicted behavior of the second user to second social gaming data corresponding to participation by the second user in the online social gaming environment during a second period of time after the first period of time;
updating, via the processor, the first degree of influence of the first user on the second user based on the comparison; and
analyzing, via the processor, the network graph to identify the first user as a candidate for targeted advertising when the first degree of influence satisfies a threshold and to provide information identifying the candidate to at least one of a game publisher, a social gaming service provider, or a third party advertiser.

2. The computer implemented method of claim 1, further including:
generating a sub-network graph representative of relationships between a group of users, the group of users corresponding to a portion of the users associated with the online social gaming environment having a same characteristic determined from the first social gaming data, wherein the portion of the users includes the first user and the second user, and wherein the characteristic is associated with targeted advertising; and analyzing the sub-network graph to identify the first user as a candidate for targeted advertising when the first degree of influence satisfies a threshold.

3. The computer implemented method of claim 1, wherein the first social gaming data includes a historical timeline of transactions, and the different types of the first social gaming data correspond to at least some of the transactions corresponding to a purchase of a game, a purchase of a virtual product associated with a game, or a purchase of a real product associated with a game.

4. The computer implemented method of claim 1, wherein the different types of the first social gaming data include at least one of a duration of the relationship between the first user and the second user, a game preference, an interaction between the first user and the second user, a purchase of a real product associated with a game, a group with which the first or second user is associated, a primary group with which the first or second user is associated, a geographic location of the first user or the second user, an amount of time online, a last date online, or a frequency of time online.

5. The computer implemented method of claim 1, wherein the different types of the first social gaming data include at least one of a game played, a game purchased, a type of game played, a type of game purchased, a frequency of game play, an amount of time of game play, a game most frequently played with another user, or a time of day of game play.

6. The computer implemented method of claim 1, wherein the different types of the first social gaming data include an overlap of game play with another user.

7. The computer implemented method of claim 1, wherein the different types of the first social gaming data include a purchase of a virtual product associated with a game.

8. The computer implemented method of claim 1, wherein the first degree of influence of the first user on the second user is based on an amount of the social gaming data associated with the first user that corresponds to the social gaming data associated with the second user.

9. The computer implemented method of claim 1, wherein the online social gaming environment corresponds to one of a social networking website or a dedicated social gaming network.

10. The computer implemented method of claim 1, wherein the first degree of influence of the first user on the second user is different than a second degree of influence of the second user on the first user.

11. The computer implemented method of claim 1, further including:
calculating a second degree of influence of the first user of the online social gaming environment on a third user of the online social gaming environment; and
calculating a combined degree of influence for the first user based on the first degree of influence of the first user and the second degree of influence of the first user.

12. The computer implemented method of claim 1, further including:
calculating a strength of relationship between the first user and the second user; and
calculating the first degree of influence based on the strength of relationship.

13. A system comprising:
a prediction model generator to predict a behavior of a second user in an online social gaming environment based on a first degree of influence of a first user in the online social gaming environment on the second user;
a processor to determine the first degree of influence of the first user on the second user based on first social gaming data corresponding to participation by the first user and the second user in the online social gaming environment during a first period of time, the processor to compare the predicted behavior of the second user to second social gaming data corresponding to participation by the second user in the online social gaming environment during a second period of time after the first period of time, the processor to update the first degree of influence of the first user on the second user based on the comparison, wherein different types of the social gaming data are to be weighted differently when calculating the first degree of influence of the first user on the second user, the different weights based on when the different types of the social gaming data were collected, wherein a first weight of older social gaming data of a first type is to be less than a second weight of newer social gaming data of the first type, wherein the first degree of influence of the first user on the second user is different than a second degree of influence of the second user on the first user;
a network graph generator to generate a network graph representative of relationships between a plurality of users associated with the online social gaming environment, the relationships based on connections between the users, the plurality of users including the first and second users, the network graph representative of the first degree of influence of the first user on the second user and the second degree of influence of the second user on the first user; and
a target identifier to identify the first user as a candidate for targeted advertising when the first degree of influence satisfies a threshold and to provide information identifying the candidate to at least one of a game publisher, a social gaming service provider, or a third party advertiser.

14. A tangible computer readable storage medium comprising instructions which, when executed, cause a machine to at least:
generate a network graph representative of relationships between users associated with an online social gaming environment, the relationships based on connections between the users;
collect first social gaming data corresponding to participation by a first user and a second user in the online social gaming environment during a first period of time, the first social gaming data including first user data corresponding to the first user and second user data corresponding to the second user;
calculate a first influence of the first user of the online social gaming environment on the second user of the online social gaming environment, the first influence based on the first social gaming data, the first influence selected from a plurality of different degrees of influence corresponding to different portions of the first user data that match the second user data;
assign weights to the different portions of the first user data, the weights to decrease over time based on when corresponding ones of the different portions of the first user data were collected;

calculate a second influence of the first user of the online social gaming environment on a third user of the online social gaming environment;
calculate a combined influence for the first user based on the first influence of the first user and the second influence of the first user;
predict a behavior of the second user based on the first influence of the first user on the second user;
compare the predicted behavior of the second user to second social gaming data corresponding to participation by the second user in the online social gaming environment during a second period of time after the first period of time; and
update the first influence of the first user on the second user based on the comparison;
identify the first user as a candidate for targeted advertising based on the network graph when the combined influence satisfies a threshold; and
identify the candidate to at least one of a game publisher, a social gaming service provider, or a third party advertiser.

* * * * *